Figure 1:
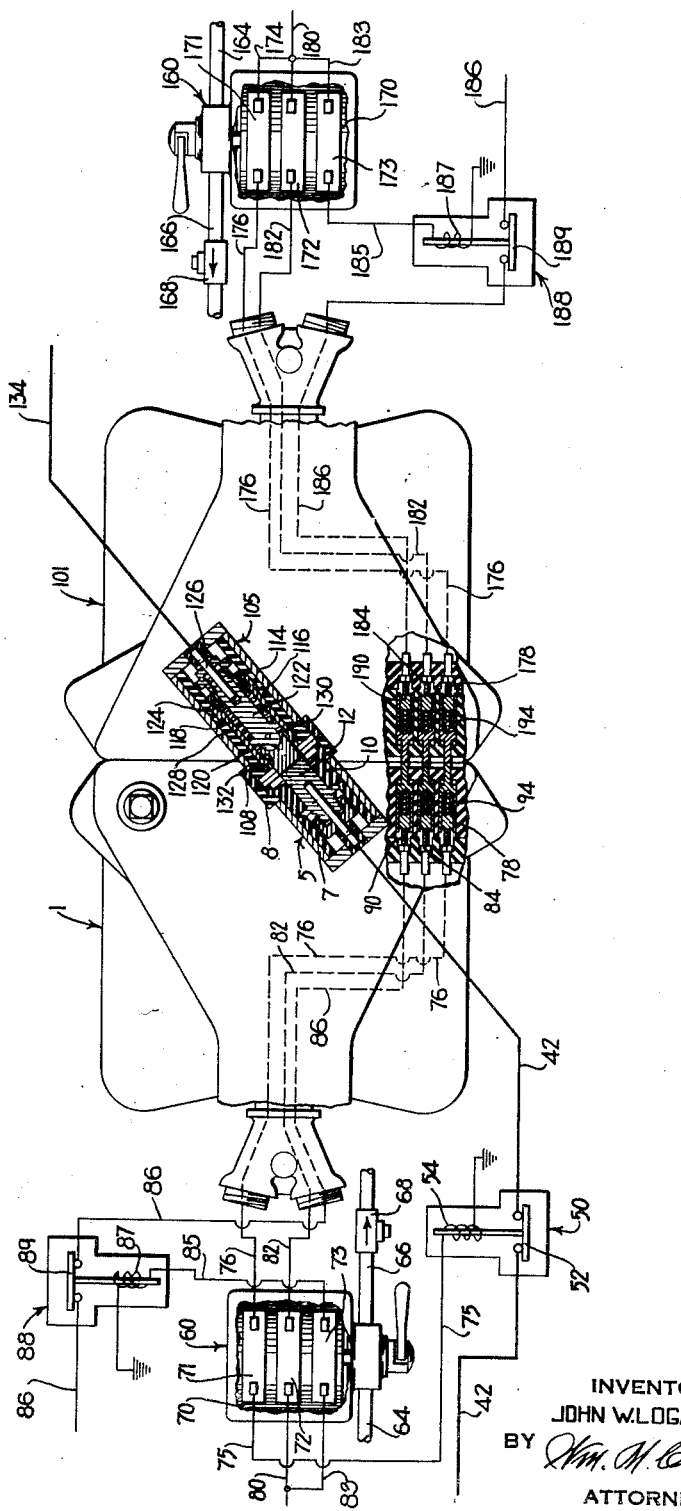

March 28, 1939. J. W. LOGAN, JR 2,151,926
CONTROL MEANS FOR BUS SWITCHES
Filed Aug. 14, 1936   3 Sheets-Sheet 1

INVENTOR
JOHN W. LOGAN JR.
BY Wm. M. Cady
ATTORNEY

March 28, 1939. J. W. LOGAN, JR 2,151,926
CONTROL MEANS FOR BUS SWITCHES
Filed Aug. 14, 1936  3 Sheets-Sheet 2
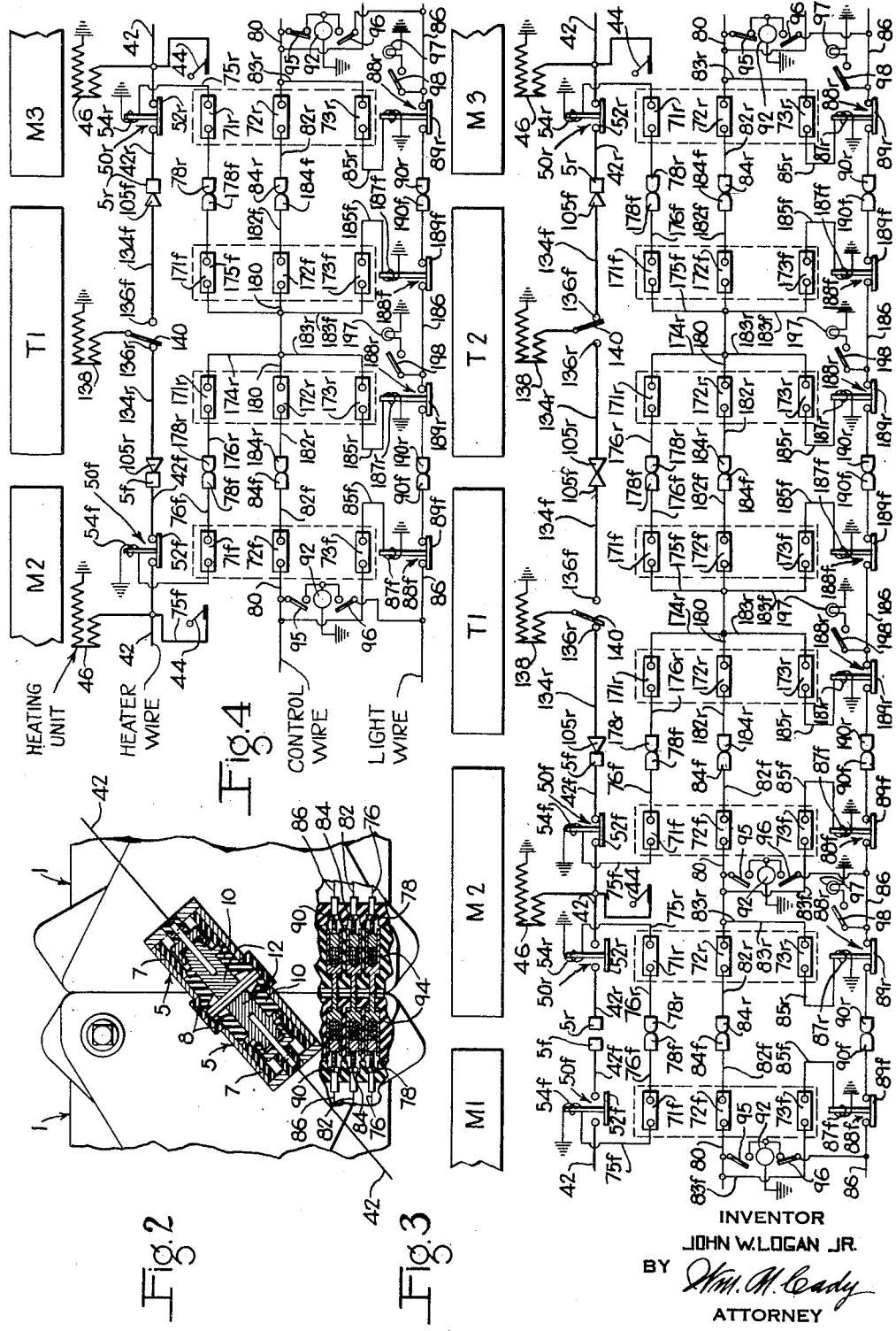
INVENTOR
JOHN W. LOGAN JR.
BY Wm. M. Cady
ATTORNEY March 28, 1939.   J. W. LOGAN, JR   2,151,926
CONTROL MEANS FOR BUS SWITCHES
Filed Aug. 14, 1936   3 Sheets-Sheet 3

INVENTOR
JOHN W. LOGAN JR.
BY Wm. H. Cady
ATTORNEY

Patented Mar. 28, 1939

2,151,926

UNITED STATES PATENT OFFICE 2,151,926

CONTROL MEANS FOR BUS SWITCHES

John W. Logan, Jr., Forest Hills, Pa., assignor to The Westinghouse Air Brake Company, Wilmerding, Pa., a corporation of Pennsylvania Application August 14, 1936, Serial No. 96,020

10 Claims. (Cl. 213—212)

This invention relates to car coupling means and more particularly to car coupling means adapted to establish electric circuits between the cars of the train.

The vehicle equipment of certain electric railways includes power or motor cars which are equipped with driving motors and control equipment therefor as well as means to collect current from a suitable conductor, such as a trolley wire or third rail.

The vehicle equipment of these railways also includes trailer or auxiliary cars which are not provided with driving motors, but are intended to be drawn by the motor or power cars. These cars are equipped with electrical heating means, and as the trailer cars do not have means to collect current from the trolley wire or third rail, it is necessary to supply them with current from the motor or power cars.

It is the practice to couple the cars into trains which include a plurality of motor cars. Each of the motor or power cars carries current collecting means to collect current from the supply line, and these will contact the supply line at points spaced apart a substantial distance. There may be a difference in the voltage of the current at these points in the supply line, and if a circuit is established between motor or power cars in a train, current will flow from the power car energized with current at the higher voltage to the power car supplied with current at the lower voltage to supply the driving motors and other equipment on these cars.

If such a circuit were established a very heavy current might flow through it, and it is not desired to transmit this current through the cars. The coupling equipment must be arranged, therefore, so that when two motor cars are coupled into a train no connections will be established between these motor cars which are directly connected to the trolley or supply line, or to the driving motors.

While the coupling means must be arranged to prevent the establishment of undesired circuits between motor cars, it is essential that the coupling means be arranged so that when a motor car and a trailer car are connected together, a circuit from the current collecting means on the motor car to the trailer car may be established to supply current to the heating means on the trailer car. However, this circuit must be arranged so that when a trailer car is connected between two motor cars there is no possibility of establishing an electrical connection between these motor cars through this circuit.

It is the practice to provide cars of this type with automatic coupling devices having electric portions incorporating contact carrying slides which are projected into engagement with the corresponding slide of a counter-part coupling immediately after the cars are coupled together in order to establish electric circuits throughout the train.

It is desirable that the circuit through which current is supplied from the motor cars to the heating means on the trailer cars be established through contacts associated with the couplers, and which engage when the couplers are connected together, so that the circuit will be automatically completed without special attention from the trainmen or others.

The circuit by means of which the heating means on the trailer cars is supplied with current carries a heavy current at a relatively high voltage, and if the contact carried by a car coupler is energized at a time that the coupler is not connected to another coupler, at which time the contact is exposed, there is possibility of injury to workmen or others who may touch this contact.

It is desirable, therefore, that the car couplers incorporate means to maintain these contacts deenergized or otherwise protected until the couplers are connected together, and to thereafter supply current to this circuit.

It is desirable also that the making and breaking of this circuit be provided for by means other than the separable contacts carried by the couplers, as these are not adapted for this service. This may be cared for by a contactor, and the control for this contactor is preferably arranged so that the contactor will not complete the circuit controlled thereby until after the couplers have been brought together, and so that the contactor will operate to break the circuit controlled thereby before the couplers are separated, so that the contacts carried by the couplers and controlling the circuit to the heater on the trailer car will be deenergized while they are separated.

It is desired also to provide these cars with a control wire, which when the cars are coupled together into a train, provides a circuit extending throughout the entire train.

It is desired to supply this circuit with current from the motor car at one end of the train, and to provide means associated with the uncoupling valves to interrupt this circuit before the contacts carried by the couplers are separated.

As this circuit carries a relatively heavy current, it may be desired to employ magnetic contactors to control the circuit and to have the supply of current to the windings of these contactors controlled by means associated with the uncoupling valves. The current for the windings of the contactors is supplied from the control wire controlled by the contactors.

As the various cars are coupled into trains, the control wire may be energized from the car at either end of a train, and it is necessary, therefore, to provide means for closing the contactors regardless of the side of the contactor to which current is supplied to the control wire.

It is an object of this invention to provide car coupling means adapted for use under the conditions described above and which operates to overcome the problems heretofore pointed out.

A further object of the invention is to provide car coupling means of the type described and which is of simple and rugged construction, which is reliable in operation, and which is inexpensive to build.

Another object of the invention is to provide car coupling means of the type described, and which requires a minimum of alteration in standard couplers now produced for this general class of service.

A further object of the invention is to provide a car coupling system for use on cars some of which have current collecting means and others of which have current consuming means, the couplers having contacts adapted to engage when the couplers are coupled together to establish a circuit between the cars, the cars having current collecting means thereon also having circuit control means to control the circuit to the said contacts, the cars having current consuming means thereon having means to control operation of the circuit control means on the cars connected thereto.

Another object of the invention is to provide car coupling means of the type described, and carrying contacts in a control circuit, which when the cars are coupled together extends throughout the train, and having magnetic contactors for controlling this circuit, together with means to effect operation of the contactors with current supplied from the control circuit, regardless of the point at which current is supplied to the control circuit.

A further object of the invention is to provide improved car coupling and train line circuit control means.

Other objects of the invention and features of novelty will be apparent from the following description taken in connection with the accompanying drawings, in which Fig. 1 is a diagrammatic view, partly in section, of coupling equipment embodying this invention, the equipment shown including a coupler for a motor or power car, and a coupler for a trailer or auxiliary car.

Figure 5:
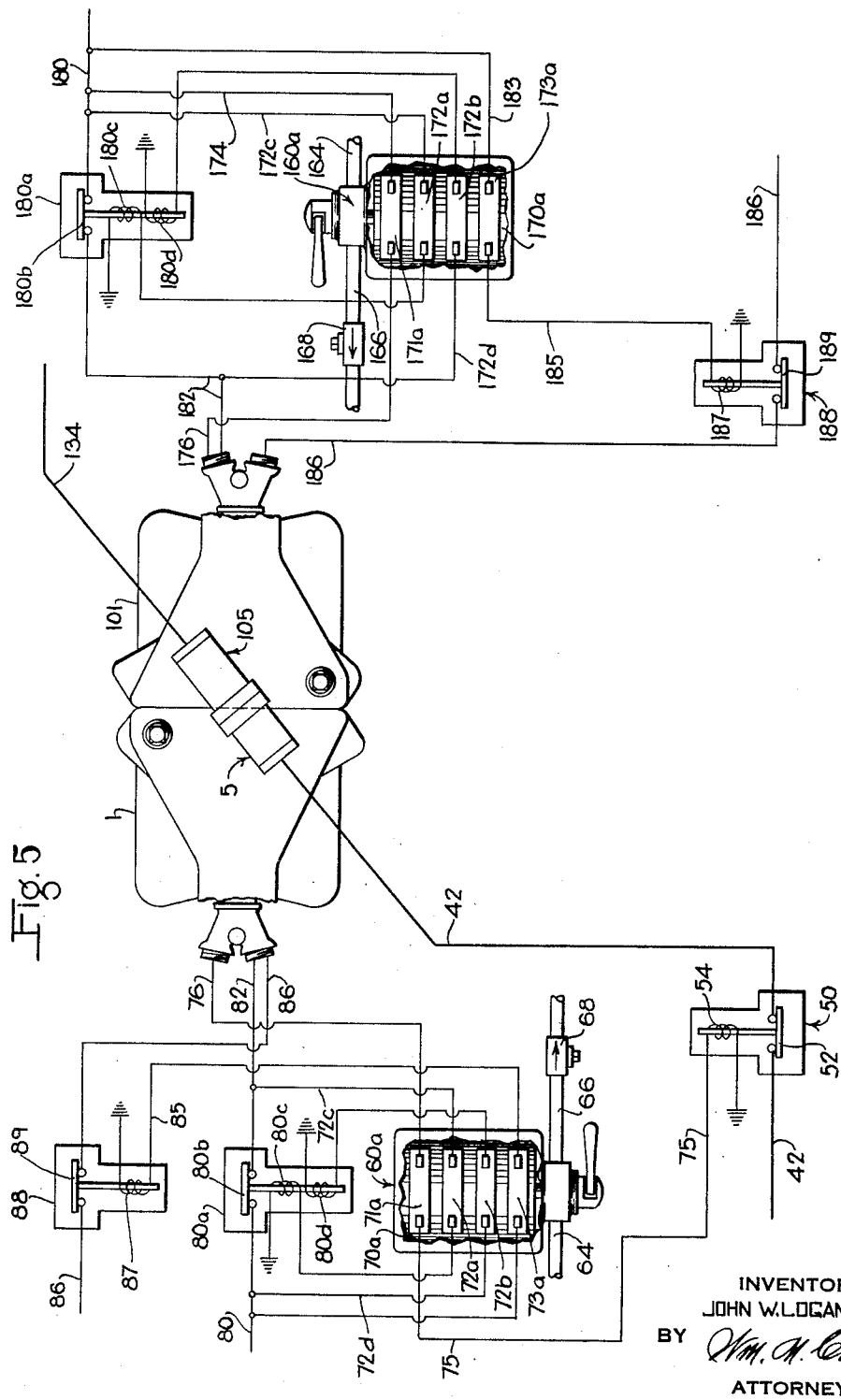

Fig. 2 is a fragmentary view, partly in section, of portions of the couplers for two motor cars, Fig. 3 is a diagram of the circuit connections in a train which includes both motor cars and trailer cars, Fig. 4 is a diagram of the circuit connections in another train which includes both motor cars and trailer cars, and Fig. 5 is a diagram of the circuit connections which may be employed where magnetic contactors are employed to control the control circuit.

In Fig. 1 of the drawings there are illustrated couplers indicated generally by the reference numerals 1 and 101. The coupler 1 is of the type which is adapted to be employed on a motor or power car, while the coupler 101 is of the type which is adapted to be employed on a trailer or auxiliary car.

The couplers 1 and 101 are substantially counterparts and are identical in construction and operation except in a few particulars, as will hereinafter more fully appear.

The couplers 1 and 101 are preferably of the type known as tight lock couplers, and couplers of the type employed in this application are shown and claimed in U. S. Patent No. 1,571,222, to H. F. Woernley. A complete description of the construction and operation of the couplers may be found in the above identified patent, and only such portions of the construction and operation of the couplers are included herein as are essential to the understanding of this invention.

The coupler 1, which is of the type adapted to be associated with a motor or power car, has mounted on the upper face thereof a contact assembly indicated generally by the reference numeral 5, and adapted to cooperate with a complementary contact assembly 105 mounted on a coupler 101 associated with a trailer or auxiliary car.

The contact assembly 5 comprises a body 7, which may be constructed of any suitable material, and is secured by suitable means, not shown, in the proper position on the face of the body of the coupler 1.

The end of the body 7 is surrounded by an annular ring 8 constructed of resilient material, such as moulded rubber. The ring 8 projects from the body of the contact assembly a short distance so as to surround and enclose the open face of the contact assembly.

The body 7 has a tubular bushing 10 formed of suitable insulating material mounted therein, while a contact 12, formed of a suitable material which is a conductor of electricity is rigidly secured in the bushing 10. The contact 12 is provided on one end with a contacting face which is adapted to be engaged by a contact carried by the coupler on a trailer or auxiliary car, as will hereinafter more fully appear. The contacting face of the contact 12 is preferably positioned substantially in the plane of the face of the bushing 10, and within the area enclosed by the ring 8.

The contact assembly 105, which is associated with the coupler 101 on a trailer or auxiliary car, comprises a body 114 which may be formed of any suitable material, and which is adapted to be secured by suitable means, not shown, to the face of the coupler 101. The end of the body 114 is surrounded by an annular ring 108, which is constructed of resilient material, and is identical in construction with the corresponding member employed on the contact assembly 5. The ring 108 projects from the face of the contact assembly 105 so as to surround and enclose this face.

The body 114 of the contact assembly 105 has an insulating bushing 116 mounted therein, while a sleeve 118 is positioned in this bushing. A movable contact 120 is slidably mounted in the sleeve 118, and is pivotally secured to a stem 122, which is also slidably mounted in the sleeve 118, and extends through a threaded member 124, which is secured in the sleeve 118.

A rod 126 is secured to, but insulated from, the housing 114, and extends into a bore in the stem 122. The rod 126 is of such size as to snugly fit the bore in the stem 122 so as to firmly engage the walls of the bore, and thereby establish good electrical contact between the rod 126 and the stem 122.

A spring 128 extends between the threaded member 124 and a shoulder on the stem 122, and yieldingly urges the movable contact 120 out of the sleeve 118.

The movable contact 120 has a radially outwardly extending shoulder 130 thereon, which engages an inwardly extending shoulder 132 on the sleeve 118 to limit movement of the movable contact 120 by the spring 128.

The movable contact 120 is proportioned so as to project from the face of the insulating bushing 116 a substantial distance, and to also extend beyond the margin of the ring 108 when it is in its fully extended position.

The contact assemblies 5 and 105, respectively, are arranged on the couplers 1 and 101 so that when the couplers 1 and 101 are coupled together, the movable contact 120, which projects from the contact assembly 105, will engage the face of the contact 12 before the couplers 1 and 101 are drawn completely together by the means incorporated in the couplers. As the couplers are thereafter drawn together, the contact assemblies 5 and 105 are drawn together, and the movable contact 120 is forced back against the spring 128, which serves to maintain the movable contact 120 in firm engagement with the fixed contact 12, thereby establishing good electrical connection between these contacts.

When the couplers 1 and 101 are brought together, the annular rings 8 and 108 engage and press against each other. As these rings are constructed of rubber they yield readily so as not to interfere with the movement of the contacts 12 and 120 towards each other, but they firmly engage, however, so as to form an enclosure around the contacts 12 and 120.

The contact 12 of the contact assembly 5, which is associated with the coupler 1, which is of the type adapted for service on motor or power cars, is of such length, and is positioned in the body 7 in such a manner, and the body 7 is so located on the coupler 1, that when two couplers of the type adapted for service on motor or power cars are connected together, the contacts 12 of the contact assemblies 5 carried thereby will not engage, but will be spaced apart a substantial distance, as is clearly shown in Fig. 2 of the drawings, so that no connection will exist between the circuits on the motor cars associated with these contact assemblies.

This is important as these circuits are connected to the current collecting means on the motor cars, and while these circuits are interrupted by magnetic contactors on the motor cars, these contactors may fail to function properly, and if a circuit were established between the couplers it might result in connecting portions of the line of different voltage.

The movable contact 120 of the contact assembly 105, which is associated with the coupler 101, which is of the type adapted for service on trailer or auxiliary cars, is arranged so that it will recede into the body of the contact assembly 101 a distance great enough that when two couplers of the type adapted for service on trailer or auxiliary cars are connected together, the contact assemblies 105 will match together properly without injury to the contact portions of the contact assemblies.

The equipment on either end of the motor cars and trailer cars is substantially a duplicate of the equipment on the other end of the same car. For convenience in description, the trains shown in Figs. 3 and 4 of the drawings will be considered as travelling from left to right, as viewed in these figures of the drawings, and the reference numerals for the elements related to the equipments on the right hand ends of these cars are followed by the suffix $f$, and the reference numerals for the elements related to the equipment on the left hand ends of the cars are followed by the suffix $r$. The suffixes are omitted in the description of the elements shown in Figs. 1 and 2 of the drawings, as these elements may be employed on either end of a car.

The rod 126 of the contact assembly 105$f$ associated with the coupler on the forward end of a trailer or auxiliary car is connected by way of a wire 134$f$ with a contact 136$f$, while the contact assembly 105$r$ associated with the coupler on the other end of the trailer car is connected by way of a wire 134$r$ with a contact 136$r$, as is best shown in Figs. 3 and 4 of the drawings.

A current consuming device 138 on the trailer car, in this case a resistance heating unit, is connected to a movable switch blade 140, which may be moved to establish contact with either of the contacts 136$f$ and 136$r$, but not with both of them at the same time. This arrangement enables the heating unit 138 to be connected to the contact assembly associated with the coupler on either end of the trailer car, and it insures that a circuit cannot be established between these contact assemblies.

The contact assemblies 5$f$ and 5$r$ associated with the couplers on the ends of the motor cars are connected through magnetic contactors by way of wires 42$f$ and 42$r$ with the current collecting means, such as the trolley indicated at 44, which is carried by each of the motor cars.

The heating unit 46 on the motor car is also connected to the trolley 44, and the circuit through which this connection is established may be controlled by means of a switch, not shown.

The circuit on a motor car between each of the contact assemblies 5 and the trolley 44 is controlled by means of a magnetic contactor 50, having a movable contact 52, which is operated by a winding 54. The movable contact 52 has biasing means, not shown, associated therewith, and yieldingly urging it to the position to open the circuit controlled thereby between the trolley 44 and the contact assembly 5. On energization of the winding 54 the movable contact 52 is moved to the position to complete the circuit between the contact assembly 5 and the trolley 44.

The equipment provided by this invention includes means to control the supply of current to the windings of the magnetic contactors 50 on the motor cars so that the winding of the contactor associated with a coupler is energized only when a trailer car is connected to the coupler with which the contactor is associated, and then only when the mechanism in the couplers on both the motor and trailer cars is conditioned to maintain the couplers coupled together.

Referring to Fig. 1 of the drawings, it will be seen that the coupler 1, which is of the type adapted for use on motor or power cars, has an uncoupling valve device, indicated generally by the reference numeral 60, associated therewith for controlling the supply of fluid under pressure to portions of the coupler. The uncoupling valve device 60 has associated therewith an electric portion for controlling the circuit to the winding 54 of the magnetic contactor 50, and for also controlling certain other circuits, as will hereinafter more fully appear.

The coupler 101, which is of the type adapted for use on trailer or auxiliary cars, has associated therewith an uncoupling valve device indicated generally by the reference numeral 160. This uncoupling valve device is similar in construction and operation to the uncoupling valve device 60 associated with the coupler 1, and has an electric portion which controls the supply of current to the winding 54 of the magnetic contactor 50 on the motor car, and in addition, controls certain of the circuits from the motor car to the trailer car.

The uncoupling valve devices 60 and 160 correspond to the cocks identified by the reference numerals 43 in the above mentioned U. S. Patent No. 1,571,222.

The pneumatic portion of the uncoupling valve device 60 controls the supply of fluid under pressure from a reservoir or other source, not shown, which is connected to the valve by way of a pipe 64, to a pipe 66 leading to the operating mechanism of the coupler 1. The pipe 66 has a check valve 68 interposed therein and operative to permit fluid under pressure to flow from the uncoupling valve device 60 to the coupler 1 and to prevent the flow of fluid from the coupler 1 to the uncoupling valve device 60.

The pneumatic portion of the valve device 60 is movable between a normal or coupling position, in which the supply of fluid under pressure to the coupler 1 is cut off, and an uncoupling position, in which the valve device opens a communication through which fluid under pressure may flow from the source to the coupler to condition the coupler to permit the cars to be separated.

The pneumatic portion of the uncoupling valve device 160 controls the supply of fluid under pressure from a source, not shown, on the trailer car, which is connected to the valve device by way of a pipe 164, to a pipe 166 which leads to the coupler 101. The pipe 166 has a check valve 168 interposed therein, and operative to permit fluid to flow from the uncoupling valve 160 to the coupler 101, and to prevent the flow of fluid from the coupler 101 to the uncoupling valve device.

The pneumatic portion of the uncoupling valve device 160 is movable between a normal or coupling position, in which the supply of fluid under pressure to the pipe 166 is cut off, and an uncoupling position, in which the valve device opens a communication through which fluid under pressure may flow from the source to the coupler 101 to condition the coupler to permit the cars to be separated.

The electric portion of the uncoupling valve device 60, which is associated with the coupler 1, which is of the type adapted for service on a motor or power car, comprises a drum 70, which is operatively connected to the valve of the uncoupling valvel device so as to be moved when the valve is moved. The drum 70 carries contacts 71, 72 and 73, which are electrically insulated from each other and are adapted to complete and interrupt certain circuits, as will hereinafter more fully appear.

When the uncoupling valve device 60 is in its normal or coupling position, the contact 71 is engaged by a contact finger having a wire 75 connected thereto, which is connected to one terminal of the winding 54 of the magnetic contactor 50. The other terminal of the winding 54 is connected to ground.

In the normal or coupling position of the valve device 60, the drum contact 71 is also engaged by a contact finger having a wire 76 connected thereto, and this wire is also connected to a contact 78 in the electric portion 94 of the coupler 1.

In this position of the uncoupling valve device 60, the drum contact 72 is engaged by a contact finger to which is connected the control wire 80, and this drum contact is also engaged at this time by a contact finger which is connected by way of a wire 82 with a contact 84 in the electric portion 94 of the coupler 1.

The drum contact 73, in this position of the valve device 60, is engaged by a contact finger which is connected by way of a wire 83 with the control wire 80, while this drum contact is also engaged at this time by a contact finger which is connected by way of a wire 85 with one terminal of the winding 87 of a magnetic contactor 88 having a movable contact 89 which controls the circuit through the light wire 86. The other terminal of the winding 87 is connected to ground, while the wire 86 is connected to a contact 90 in the electric portion 94 of the coupler 1.

When the valve of the uncoupling valve device 60 is turned from the normal or coupling position to the uncoupling position, the drum 70 is moved so as to move the drum contacts 71, 72 and 73 out of engagement with some of the contact fingers which engage them in the normal or coupling position of the valve device, so as to interrupt the circuits through the drum contacts.

The electric portion of the uncoupling valve device 160, which is associated with the coupler 101, which is of the type adapted for service on trailer or auxiliary cars, is similar to the electric portion of the uncoupling valve device 60, and comprises a drum 170 which is operatively connected to the valve of the valve device so as to be moved when this valve is moved.

The drum 170 carries contacts 171, 172 and 173 which are electrically insulated from each other, and are adapted to complete and interrupt certain circuits, as will hereinafter more fully appear.

When the valve of the uncoupling valve device 160 is in the normal or coupling position, the drum contact 171 is engaged by a contact finger which is connected by way of a wire 174 to the control wire 180, while in this position of the drum 170, this drum contact is also engaged by a contact finger which is connected by way of a wire 176 with a contact 178 in the electric portion 194 of the coupler 101.

In this position of the drum 170, the drum contact 172 is engaged by a contact finger to which is conected the control wire 180 on the trailer car, while at this time this drum contact is also engaged by a contact finger which is connected by way of a wire 182 with a contact 184 in the electric portion 194 of the coupler 101.

The drum contact 173, in this position of the drum 170, is engaged by a contact finger which is connected by way of a wire 183 with the control wire 180, while this drum contact is also engaged at this time by a contact finger which is connected by way of a wire 185 with one terminal of the winding 187 of a magnetic contactor 188 having a movable contact 189 which controls the circuit through the light wire 186 on the trailer or auxiliary car. The other terminal of the winding 187 is connected to ground, while the wire 186 is conected to a contact 190 in the electric portion 194 of the coupler 101.

When the valve of the uncoupling valve device 160 is turned from the normal or coupling position to the uncoupling position, the drum 170 is turned so as to move the drum contacts 171, 172 and 173 out of alignment with some of the contact fingers which engage them in the normal position of the drum so as to interrupt the circuits through these drum contacts.

The electric portions 94 and 194 of the couplers 1 and 101 are mounted below the coupler bodies, and, as explained in detail in the above mentioned U. S. Patent No. 1,571,222 to H. F. Woernley, the electric portions comprise retractable contact carrying slides which are adapted to be moved towards and away from each other.

The electric portions 94 of the couplers for motor cars, and 194 of the couplers for the trailer cars, are identical in construction and carry a number of contacts which are adapted to engage when two couplers are coupled together. These contacts are adapted to engage each other whether the couplers are for a motor car and for a trailer car, as shown in Fig. 1 of the drawings, or whether the couplers are for two motor cars, as shown in Fig. 2 of the drawings, or are the couplers for two trailer cars. The electric portions 94 and 194 of the couplers are substantially the same as the corresponding portions of the couplers now in service. The electric portions 94 and 194 of the couplers include the contacts which are associated with the circuits controlled by the electric portions of the uncoupling valve devices, as well as a number of other contacts, not shown.

The contacts of the electric portions 94 and 194 are similar in construction, and, as shown, include contacting portions which are slidably mounted in bores in the body of the electric portion, which body is formed of insulating material. The contacting portions each include a projecting portion which extends beyond the face of the body of the electric portion, and is adapted to engage the projecting portion associated with a contact on the electric portion of the connected coupler.

The projecting portions of the contacts are yieldingly urged outwardly by springs associated therewith, while members are provided which engage the contacting portions and have connected thereto the wires for the circuits associated with the contacts.

Each of the motor or power cars is provided with a dynamotor 92 which is driven by power supplied by the trolley on this car by means not shown. One terminal of each of the dynamotors is grounded, while the other terminal of each of the dynamotors may be connected to the control wire 80 by means of a circuit controlled by a switch 95, and it may be connected to the light wire 86 by means of a circuit controlled by a switch 96.

In addition to the equipment described above, each of the motor cars is provided with electric lights indicated at 97, which may be supplied with current from the light wire 86 by means of a circuit controlled by a switch 98, while each of the trailer cars is provided with electric lights indicated at 197 which may be supplied with current from the light wire 186 by means of a circuit controlled by a switch 198.

In Fig. 3 of the drawings there is shown a diagram of certain of the circuit connections which are established in a train which includes both trailer or auxiliary cars and motor or power cars. This diagram is representative of circuits which are established when different kinds of cars are coupled together, and different combinations of cars than those shown may be coupled into a train.

The train shown in Fig. 3 of the drawings includes motor or power cars designated M1, M2 and M3, and trailer or auxiliary cars T1 and T2. As stated above the motor or power cars are equipped with current collecting means, which may be in the form of a trolley or a shoe which engages a third rail, while the trailer or auxiliary cars do not have current collecting means. The trailer or auxiliary cars are equipped with heating and lighting means which must be supplied with current from the motor cars.

When a plurality of cars are coupled into a train, the dynamotor 92 on the motor car at one end of the train is connected to the control wire 80 on this car so as to supply current to this wire, while the dynamotor 92 on the motor car at the other end of the train is connected to the light wire 86. For purposes of illustration the train shown in Fig. 3 of the drawings has the dynamotor 92 on the motor car M1 connected to the light wire 86, and the dynamotor 92 on the motor car M3 connected to the control wire 80.

The circuits are arranged so that every trailer car must be connected at one end to a motor car, and the circuit connections which are established between a motor car and a trailer car such as the cars M2 and T1 of the train shown in Fig. 3 when cars of this type are coupled together will be described first.

It will be assumed that the cars M2 and T1 are not coupled together, and the coupling thereof is to be effected. It will be assumed also that the uncoupling valve devices on both the trailer car and motor car are in their normal or coupling positions, in which position the electric portions of these valve devices are conditioned to establish the circuits controlled thereby.

In addition, it will be assumed that the car M2 is coupled at the other end to the motor car M1, as shown in Fig. 3 of the drawings, and that the switch 95 on the car M1 is open so that the dynamotor 92 thereon is not connected to the control wire 80, but that the switch 96 on the car M1 is closed so as to connect the dynamotor 92 to the light wire 86.

It will also be assumed that the trailer car T1 is connected to one end of the trailer car T2, and that the other end of the trailer car T2 is connected to the motor car M3 as shown in Fig. 3 of the drawings. It will be further assumed that the switch 95 on the motor car M3 is closed so that current is supplied from the dynamotor 92 to the control wire 80, with the result that the control wire 180 on the trailer car T1 is energized, and that the switch 96 is open so that no current is supplied from the dynamotor on the motor car M3 to the light wire 86 thereon.

If at this time the motor car M2 is in a portion of the track which is provided with a current supply line, and if the current collecting means, in this case the trolley 44, is conditioned to collect current from the supply line, a circuit will be established from the trolley 44 to the wire 42, to which is connected the heating unit 46 on the motor car, and which wire 42 is adapted to be connected through the magnetic contactors 50r and 50f to the contact assemblies 5r and 5f of the couplers at each end of the car.

At this time the windings 54r and 54f of the magnetic contactors 50r and 50f are connected through the electric portions of the uncoupling valve devices to the contacts 78r and 78f in the electric portions of the couplers at the ends of the car.

The end of the car to which it is intended to couple a trailer car, and for purposes of illustration, this may be considered as a right hand or forward end of the motor car M2, as this car is viewed in Fig. 3 of the drawings, not being coupled up at this time, the contact 78f in the electric portion of this coupler will not be energized.

The winding 84f of the magnetic contactor 50f associated with the coupler on this end of the car will, therefore, be deenergized and the contactor 50f will be in open position so as to interrupt the circuit through the wire 42f to the contact assembly 5f, with the result that the contact 12 of the contact assembly 5f will be deenergized. As this contact is deenergized at this time, there is no danger of injury to a workman or other person who might touch the exposed face of the contact 12 of the contact assembly 5f.

At this time, as the uncoupling valve device on the forward end of the motor car M2 is in its normal or coupling position, a circuit is established through the control wire 80 to the contact 84f in the electric portion of the coupler at this end of the car.

As the coupler is not coupled to another coupler at this time the retractable contact carrying slide of the electric portion of the coupler is in the retracted position, and a door is in a position to cover the ends of the contacts of this slide, as explained in detail in the above mentioned U. S. Patent No. 1,571,222. The presence of this door prevents a workman or other persons from reaching the contact 84f which may be energized at this time.

At this time the control wire 80 on the motor car M2 is assumed to be deenergized, so that even though the uncoupling valve device 60 is in a position to establish a circuit from the control wire through the winding 87f of the contactor 88f, no current will be supplied to this winding, and the movable contact 89f thereof will remain in the open position in which it interrupts the circuit through the light wire 86.

Each motor car is provided wtih lights indicated at 97 for lighting the car. These lights are supplied with current from the light wire 86 by means of a circuit controlled by a switch 98, which is shown in the drawings in the open position.

The equipment at each end of the motor car M2 is the same, and when either end of the car is not coupled to another car, the circuit connections and the equipment are in the condition described in detail above with respect to the contacts and apparatus at the right hand end of the car.

The condition of the circuits on the end of the trailer or auxiliary car prior to coupling the end of the trailer car to another car will now be considered, and for purposes of illustration, the condition of the contacts and circuits at the left hand or rear end of the trailer car T1 will be considered.

At this time, as this end of the trailer car T1 is not coupled to another car, the contact assembly 105r will not establish contact with any other contact assembly, and, as a result, the wire 134r which connects the contact assembly 105r with the contact 136r will be deenergized. If the switch blade 140 is in a position to connect the heating unit 138 with the contact 136r, the heater unit will be deenergized.

If the switch blade 140 is in a position to establish connection between the heater unit 138 and the contact 136f, and if the wire 134f should be energized at this time, the heater unit 138 may be energized, but no circuit connection will be established between the wire 134f and the wire 134r.

In any case, therefore, the wire 134r and the contact assembly 105r on the coupler on the rear end of the trailer car T1 will be deenergized. As a result, therefore, a workman or other person who might touch the contact 20 of the contact assembly 105r will not be injured.

The contacts 178r and 184r and 190r of the electric portion of the coupler at the rear end of the trailer car T1 will be covered by the door which extends across the face of the electric portion when the coupler is in the uncoupled condition and when the contact carrying slide is in the retracted position, which is the case at this time.

If the uncoupling valve device associated with the coupler on the rear end of the trailer car T1 is in the normal or coupling position, the circuits through the electric portion of this valve device will be established, and the contact 178r will be connected by way of the wire 176r and the wire 174r to the portion of the control wire 180 on this end of the trailer car T1.

The control wire 180 on the trailer car T1 is assumed to be energized at this time with current supplied from the motor car M3, and current will, therefore, be supplied from the control wire 180 to the contact 178r.

As the control wire 180 is energized, and as the uncoupling valve device 160 on this end of the car is assumed to be in the normal or coupling position, a circuit is completed through the winding 187r of the contactor 188r so that current is supplied from the control wire 180 to this winding. As the winding 187r is energized, the movable contact 189r is held in the closed position to complete the circuit through the light wire 186, which, as pointed out above, is assumed to be deenergized at this time.

As the control wire 180 is energized and as the uncoupling valve device is in its normal or uncoupling position, the contact 184r is energized at this time.

Having described the condition of the circuits and the contacts on the right hand or forward end of the motor car M2, and on the left hand or rear end of the trailer car T1, the changes which occur when these ends of these cars are coupled together will be taken up.

When the ends of the motor car and trailer are forced together the couplers engage in the usual manner, and the mechanism in the couplers operates in the manner described in detail in the above identified U. S. Patent No. 1,571,222 to connect the cars together, and to thereafter move the contact carrying slides of the electric portions of the couplers towards each other.

When the couplers 1 and 101 approach each other they are aligned so as to cause the contact assemblies 5f and 105r carried thereby to confront each other. The movable contact 120 of the contact assembly 105r projects therefrom and will engage the face of the contact 12 of the contact assembly 5f before the couplers are fully coupled together. As the couplers are thereafter drawn together by the operating mechanism incorporated in the couplers, the contact assemblies 5f and 105r are drawn towards each other, and the movable contact 120 of the contact assembly 105r is forced back against the spring 128 incorporated in the contact assembly 105r. This spring serves to hold the movable contact 120 in firm engagement with the face of the fixed contact 12.

The contacts 12 and 120 of the contact assemblies 5f and 105r, respectively, are deenergized at the time they are brought into engagement, and as a result no arcing or burning of these contacts will occur when they are brought into engagement.

As the contact assemblies 5f and 105r are forced together, the annular rings 8 and 108 are pressed against each other so as to enclose and protect the contacts 12 and 120.

When the couplers 1 and 101 are moved substantially all of the way together, the mechanism in the couplers is operated, as described in detail in the above identified U. S. Patent No. 1,571,222, to swing the doors covering the faces of the contact carrying slides downwardly and backwardly out of the path of the contact carrying slides of the electric portions of the couplers, and these slides are thereupon moved towards each other.

When the contact carrying slides are moved together, the contacts 78f, 84f and 90f on the slide associated with the coupler 1 on the motor car engage the contacts 178r, 184r and 190r on the slide associated with the coupler 101 on the trailer car, while other contacts carried by the contact carrying slides, but not shown in the drawings, are moved into engagement so as to establish circuits between the motor and trailer cars.

When the contact carrying slides have been moved towards each other a predetermined distance, the contacting faces of the projecting portions of the contacts engage, so that on further movement of the contact carrying slides toward each other, the projecting portions of the contacts are forced back against the springs associated therewith, and which serve to hold the projecting portions in firm engagement and thereby insure good electrical contact between these members.

When the contacts 78f and 178r of the electric portions of the two couplers engage, current supplied from the dynamotor 92 on the motor car M3 to the control wire 180 on the trailer car T1 flows by way of the wire 174r and through the electric portion of the uncoupling valve device on this end of the trailer car to the wire 176r leading to the contact 178r.

Current supplied to the contact 178r flows therefrom to the contact 78f which engages the contact 178r at this time, and flows from the contact 78f by way of the wire 76f to the electric portion of the uncoupling valve device on the motor car and through a drum contact thereof to the wire 75f which leads to the winding 54f of the magnetic contactor 50f. On the supply of current to the winding of the contactor 50f the movable contact 52f is operated to complete the circuit from the trolley 44 to the contact assembly 5f on this end of the motor car.

The electric portions of the couplers are not operated to establish a circuit through the winding 54f of the magnetic contactor 50f until the couplers are completely, or substantially completely, coupled together, while the contact assemblies 5f and 105r are brought into contacting relationship during the first part of the operation of coupling the couplers together. Because of this sequence of operation, the winding of the magnetic contactor 50f on the motor car will not be energized until after the contacting portions of the contact assemblies 5f and 105r are brought into firm engagement. This insures that there will be no arcing or burning of the contacting portions of the contact assemblies 5f and 105r.

When the contact assemblies 5f and 105r are in contacting relationship, and the couplers are connected together the current carrying portions of the contact assemblies 5f and 105r are enclosed by the resilient members 8 and 108 so that workmen or others cannot touch the current carrying portions of these contact assemblies while they are energized.

Current supplied to the contact assembly 5f on the coupler associated with forward end of the motor car M2 flows therefrom to the contact assembly 105r on the coupler of the trailer car, and thence by way of the wire 134r to the switch contact 136r. If the switch blade 140 is in the position in which it is shown in Fig. 3 of the drawings so as to establish contact with the switch contact 136r, the heater unit 138 will be energized and the trailer car T1 will be heated by current supplied from the motor car M2.

If the switch lever 140 is in the position to establish contact with the switch contact 136r it will be out of engagement with the switch contact 136f and the contact 136f will not be energized with current supplied from the motor car M2, and the contact assembly 105f on the other end of the trailer car will not be connected to the motor car M2.

When the contact carrying slides of the electric portions of the couplers are moved together so that the contacts carried thereby engage, the contacts 84f and 184r engage and current from the control wire 180 on the trailer or auxiliary car T1 flows to the control wire 80 on the motor or power car M2.

On the supply of current to the control wire 80 on the motor car M2, current flows therefrom by way of the wire 83f through the drum contact 73f of the electric portion of the uncoupling valve device 60 to the wire 85f leading to the winding 87f of the contactor 88f. On the supply of current to the winding 87f, the movable contact 89f is moved from the open position to the closed position to complete the circuit through the portion of the light wire 86 on the motor car.

In addition, when the contact carrying slides of the electric portions of the couplers are moved together the contacts 90f and 190r will engage to establish a circuit between the light wire 86 on the motor car M2 and the light wire 186 on the trailer car T1 so that current supplied by the dynamotor 92 on the motor car M1 can flow to the trailer car T1 and therefrom to the trailer car T2 and to the motor car M3.

The changes which take place when a trailer car and a motor car are uncoupled will now be considered. In order to uncouple the cars, the uncoupling valve device associated with the coupler on either of the cars is turned from the normal position to the uncoupling position, and, as the result of this movement of the valve device, the drum of the electric portion of the valve device is turned so as to interrupt the circuits controlled thereby, while fluid under pressure is supplied to the operating mechanism of the couplers to cause the contact carrying slides of the electric portions of the couplers to be retracted, and to release the couplers, as explained in detail in the above mentioned Patent No. 1,571,222.

If, for instance, the uncoupling valve device 60 associated with the coupler on the forward end of the motor car M2 is turned from the normal or coupling position to the uncoupling position, then on this movement of the valve device the drum 70 will be turned and will move the drum contacts carried thereby out of engagement with certain of the contact fingers associated therewith, and will thereby interrupt the circuits through the drum contacts.

One of the circuits which is interrupted is the circuit through the winding 54f of the magnetic contactor 50f, and on interruption of this circuit the movable contact 52f of the contactor is moved by the biasing means associated therewith to interrupt the circuit through the wire 42f, which leads from the trolley 44 to the contact assembly 5f. This interrupts the circuit leading to the heating unit 138 on the trailer car T1.

The interruption of the circuit to the heating unit 138 will take place at the contacts of the magnetic contactor, which are adapted for this service, and will take place while the contact assemblies 5f and 105r are still engaged. This insures that there will be no arcing or burning of the contacts of the contact assemblies 5f and 105r, and also insures that the contacts of these contact assemblies will be deenergized before they are exposed.

In addition, on this movement of the drum 70 of the uncoupling valve device the drum contact 72f is turned to a position to interrupt the control wire 80.

The flow of current through the control wire 80 will be cut off as soon as the uncoupling valve device 60 is turned from the normal position to the uncoupling position, and at the same time fluid under pressure is supplied by way of the pipe 66 to the operating mechanism in the coupler, but the time required for the pressure of the fluid to build up in the couplers to effect operation of the coupler mechanisms is such that the circuit controlled by the drum contact in the electric portion of the uncoupling valve device will be interrupted before any movement of the coupler elements occurs.

In addition, on this movement of the uncoupling valve device 60, the drum contact 73f is turned so as to be out of engagement with one of the contact fingers associated therewith and thereby interrupt the circuit through the winding 87f of the contactor 88f.

When the winding 87f of the contactor 88f is deenergized, the movable contact 89f is moved to a position to interrupt the circuit through the light wire 86 on the motor car, thereby cutting off the flow of current between the contacts 90f and 190r in the electric portions of the couplers.

On the supply of fluid under pressure to the pipe 66 leading to the operating portions of the couplers 1 and 101 there couplers operate, as described in detail in the Patent No. 1,571,222, to first cause the contact carrying slides of the electric portions 94 and 194 to be retracted, and to cause the doors associated therewith to be moved to the position to cover the ends of the contacts of the electric portions.

Thereafter fluid under pressure is supplied to the means incorporated in the couplers to release the couplers, so that the cars on which the couplers are mounted may be separated.

On movement of the couplers 1 and 101 away from each other, the contact assemblies 5f and 105r are separated, and the movable contact 120 of the contact assembly 105r is moved outwardly by the spring 128 associated therewith until the flange 130 on the movable contact 120 engages the flange 132 on the sleeve 118.

As pointed out above, at the time that the contact assemblies 5f and 105r are separated, they are deenergized so that no arcing occurs on their separation.

The uncoupling valve device 60 is left in the uncoupling position until the cars have been separated, and then the valve device 60 is returned to the normal or coupling position. When it is returned to the normal or coupling position the supply of fluid under pressure to the coupler 1 is cut off, and latch mechanism incorporated in the coupler 1 maintains the contact carrying slide of the electric portion 94 in the retracted position, while the latch mechanism in the coupler 101 maintains the contact carrying slide of the electric portion 194 of this coupler in the retracted position.

When the uncoupling valve device 60 is returned to the normal position, the drum 70 is moved to a position to move the drum contacts carried thereby so that they are again engaged by the contact fingers associated therewith. The winding 54f of the magnetic contactor 50f will now be connected through the drum contact 71f to the contact 78f of the electric portion 94 of the coupler 1, but as this contact is no longer engaged by the contact 178r on the coupler associated with the trailer car, no current is supplied to this contact, and the winding 54f of the magnetic contactor 50f will remain deenergized.

As the winding 54f of the magnetic contactor 50f is deenergized, the movable contact 52f is maintained in the position to interrupt the circuit through the wire 42f leading to the contact assembly 5f. The contact assembly 5f, therefore, will be deenergized after the coupler 1 is disconnected from the coupler on the trailer car.

In addition, when the uncoupling valve device 60 is returned to the normal or coupling position, the drum 70 is moved to a position in which the drum contact 72f is engaged by the contact fingers associated therewith, thereby establishing a connection between the control wire 80 and the contact 84f in the electric portion 94 of the coupler 1.

The control wire 80 may be supplied with current from the dynamotor 92 at this time, and as a result the contact 84f in the electric portion of the coupler 1 may be energized.

However, as the contact carrying slide of the electric portion 94 of the coupler 1 is in the retracted position at this time, and as the faces of the contacts associated with the slide are covered, and therefore protected by the door which forms a part of the coupler mechanism, it is impossible for workmen or others to touch the contact 84f, and hence they cannot be injured.

It will be seen that as soon as the uncoupling valve device 60 on the motor car is turned from the normal or coupling position to the uncoupling position, the circuit through the winding of the magnetic contactor 50f, which controls the flow of current through the wire 42f leading to the heating unit on the trailer car, is interrupted, thereby interrupting the flow of current through the contact assemblies 5f and 105r.

In addition, it will be seen that when the uncoupling valve device 60 is turned to the uncoupling position, the circuit through the control wire 80 is interrupted, and that this will normally take place before the contact carrying slides in the electric portions of the couplers have been separated, so that no current flows between the contacts in the electric portions of the couplers at the time the contacts are separated.

If the uncoupling of the motor car M2 and trailer car T1 is effected by operation of the uncoupling valve device 160 associated with the coupler on the rear of the trailer car, instead of by operation of the uncoupling valve device 60 associated with the coupler on the front of the motor car, a similar sequence of circuit changes will be effected.

If, while the uncoupling valve device 60 on the motor car remains in the normal or coupling position, the uncoupling valve device 160 on the trailer car is turned from the normal or coupling position to the uncoupling position, the drum 170 of the uncoupling valve device 160 will be turned so as to move the drum contact 171r out of engagement with one of the contact fingers associated therewith.

This will cut off the supply of current from the control wire 180 by way of the wire 174r to the wire 176r leading to the contact 178r in the electric portion of the coupler on this end of the trailer car. On the interruption in the supply of current to the wire 176r the flow of current is cut off through the contact 178r to the contact 78f, and therefrom by way of the wire 76f through the drum contact 71f in the uncoupling valve device 60 on the motor car to the wire 75f which leads to the winding 54f of the magnetic coupler 50f.

The supply of current to the winding 54f of the magnetic contactor 50f will be interrupted, therefore, and the movable contact 52f will be moved to interrupt the circuit through the wire 42f, thereby interrupting the supply of current to the contact assemblies 5f and 105r on the couplers 1 and 101.

In addition, on movement of the valve device 160 on the trailer car from the normal position to the uncoupling position, the drum 170 thereof is moved so as to move the drum contact 172r out of engagement with one of the contact fingers associated therewith, thereby interrupting the circuit between the control wire 180 and the wire 182r through which current is supplied to the portion of the control wire 80 on the motor car.

As the connection between the wire 182r and the control wire 180 is broken, there is no current supplied from the wire 180 to the wire 182r, and, as a result, no current will flow between the contact 184r of the electric portion of the coupler on the trailer car and the contact 84f of the electric portion of the coupler on the motor car while the uncoupling valve device 160 is in the uncoupling position.

On the interruption of the supply of current to the control wire 80 on the motor car, the supply of current to the winding 87f of the contactor 88f is cut off and the movable contact 89f thereof is moved to the open position to interrupt the circuit through the light wire 86 on the motor car.

In addition, on this movement of the uncoupling valve device 60, the drum contact 173r is moved to a position to interrupt the flow of current from the wire 180 through the winding 187r of the contactor 188r on the trailer car.

On the interruption of the supply of current to the winding 187r of the contactor 188r, the movable contact 189r is moved to the open position to interrupt the circuit through the light wire 186 on the trailer car.

As the circuits through the light wires on both the motor and trailer cars is opened when the uncoupling valve device is turned to the uncoupling position, no current flows between the contacts 90f and 190r, and no arcing will occur when they are separated.

This movement of the drum 170 of the uncoupling valve device 160 occurs simultaneously with movement of the handle of the uncoupling valve device, and on this movement of the handle, the pneumatic portion of the valve device is conditioned to supply fluid under pressure from the pipe 164 to the pipe 166 leading to the operating mechanism in the couplers 1 and 101.

The couplers are operated on the supply of fluid under pressure thereto to first cause the contact carrying slides of the electric portions 94 and 194 thereof to be retracted, and to cause the doors associated therewith to be moved upwardly to cover the faces of the contacts in the contact carrying slides, while the mechanism in the couplers is thereafter operated to release the couplers and permit the cars to be separated, as explained in detail above.

It will be seen that upon operation of the uncoupling valve device 160 on the trailer car to cause the couplers 1 and 101 to be released, the circuit through the magnetic contactor 50f on the motor car is interrupted, and that this contactor operates to interrupt the circuit through the contact assemblies 5f and 105r. This circuit is interrupted before the couplers 1 and 101 are separated so that no current flows between the contact assemblies 5f and 105r at the time they are parted.

In addition, it will be seen that on movement of the uncoupling valve device 160 on the trailer car to the uncoupling position, the circuits through the control wire and through the light wire are interrupted so that at the time the contacts in the electric portions 94 and 194 of the couplers 1 and 101, respectively, are separated, no current flows between them.

After the trailer car and the motor car has been moved apart, the uncoupling valve device 160 on the trailer car is returned to normal or coupling position.

On this movement of the valve device 160 the drum contact 171r is returned to the position to establish connection between the wire 174r and the wire 176r, but as the contact 178r of the electric portion 194 of the coupler is not engaged by another contact at this time, the completion of this circuit is without effect.

In addition, on movement of the uncoupling valve device 160 to the normal position, the drum 170 of the valve device 160 is turned to the position to move the drum contact 172r to establish connection between the wire 182r and the wire 180, but this is without effect as the contact 184r in the electric portion 194 of the coupler 101 is not engaged by another contact at this time.

In addition, on movement of the uncoupling valve device 160 to the normal position, the drum contact 173r establishes connection between the control wire 180 and the wire 185r leading to the winding 187r of the contactor 188r.

On the supply of current to the winding 187r of the contactor 188r, the movable contact 189r thereof will be moved to the closed position to complete the circuit through the light wire 186 on the trailer car. As this circuit may be energized at this time, current may be supplied to the contact 190r, but this is without effect as this contact is not engaged by another contact, and it is protected by the door of the electric portion of the coupler.

From the foregoing it will be seen that this equipment operates so that the circuit through the wire leading to the electric heating means on the trailer car is interrupted on movement of the uncoupling valve devices on either the motor or trailer car to the position to permit uncoupling of the cars, and that this circuit will be interrupted before the cars are uncoupled.

This equipment also operates in such a manner that if one end of a trailer car is connected to a motor car, and the other end of this trailer car is connected to another trailer car, that no undesired circuit connections will be established between the trailer cars.

In Fig. 3 of the drawings, the trailer car T1 is shown as being connected between a motor car M2 and a trailer car T2. The circuit connections between the motor car M2 and the trailer car T1 have been explained in detail, and the condition of the circuits between the trailer cars T1 and T2 while they are coupled together will now be considered.

For purposes of illustration it will be assumed that the uncoupling valve devices associated with the couplers on these ends of the trailer cars T1 and T2 are in their normal positions, in which the electric portions thereof are conditioned to complete the circuits controlled thereby. It will be assumed also that the trailer car T1 is connected to the motor car M2, and that the trailer car T2 is connected to the motor car M3, as shown in this figure of the drawings.

When the couplers on the trailer cars T1 and T2 are moved together the contact assemblies 105f and 105r which are carried thereby engage so as to establish circuit connections therebetween. However, because of the arrangement of the equipment on the trailer cars, the establishment of a circuit between the contact assemblies 105f and 105r on the couplers of the two trailer cars is without effect.

If the switch blade 140 on the trailer car T1 is in engagement with the contact 136r so as to establish connection between the contact assembly 105r on the end of the trailer car T1 adjacent the motor car M2 and the heating unit 138, the wire leading to the contact assembly 105f on the end of the trailer car T1 adjacent the trailer car T2 will be disconnected from the contact 105r as the switch blade 140 will not engage the contacts 136r and 136f at the same time.

Similarly, if the switch blade 140 on the trailer car T2 is in engagement with the contact 136r on this car so as to establish connection with the contact assembly 105r on the end of the trailer car T2 adjacent the trailer car T1, it will connect the heater unit 138 on the trailer car T2 to this contact assembly, but this will be without effect as no current is supplied to the heater unit or to the contact assemblies 105f and 105r on these ends of the trailer cars T1 and T2.

If while the switch blade 140 on the trailer car T1 is in engagement with the contact 136r, the switch blade 140 on the trailer car T2 is moved to the position in which it engages the contact 136f, the heater unit 138 on the trailer car T2 will be connected to the contact assembly 105f at the forward end of this car, and the heater unit will be supplied with current from the motor car M3.

When the switch blade 140 on the trailer car T2 is in engagement with the contact 136f, it is out of engagement with the contact 136r so that no current will be supplied from the motor car M3 to the wire 134r on the trailer car T2. At this time the wire 134r is connected with the wire 134f on the trailer car T1, but the wire 134f is not supplied with current from the motor car M2, so the wires 134f on the car T1 and 134r on the car T2 will be deenergized.

If, on the other hand the switch blade 140 on the trailer car T1 is in engagement with the contact 136f so as to establish connection between the heater unit 138 on the trailer car T1, and the contact assembly 105f on the end of the trailer car T1 adjacent the trailer car T2 and thereby to the contact assembly 105r on the rear end of the trailer car T2, then the heater unit 138 will not be supplied with current from the motor car M2, and the contact assembly 105f on the end of the trailer car T1 adjacent the trailer car T2 will not be connected to the contact assembly 105r on the end of the trailer car T1 adjacent the motor car M2.

If at this time the switch blade 140 on the trailer car T2 is in engagement with the contact 136f so as to connect the heater unit 138 on the trailer car T2 to the contact assembly 105f on the end of the trailer car T2 adjacent the motor car M3, then the heater unit 138 on the trailer car T2 will be energized from the motor car M3, but the contact assembly 105r on the end of the trailer car T2 adjacent the trailer car T1 will not be energized, and no effect will result from the connection of the heater unit 138 on the trailer car T1 to the contact assemblies 105f and 105r on the ends of the trailer cars T1 and T2.

If while the switch blade 140 on the trailer car T1 is in engagement with the contact 136f, the switch blade 140 on the trailer car T2 is in engagement with the contact 136r on this car, the heater unit 138 on the trailer car T2 will not be energized from the motor car M3, but will be connected to the contact assembly 105r at the rear end of this car. The contact assembly 105r at the rear of the trailer car T2 will not be supplied with current from the motor car M3, nor will it be energized from the motor car M2, and the heater unit 138 on the trailer car T2 will not be energized. As a result, therefore, when the switch blades 140 on the trailer cars T1 and T2 are in these positions, the heater units on the trailer cars are connected to each other, but neither is connected to a source of current, and no circuit through the trailer cars is established between the motor cars.

It will be seen that this arrangement insures that no connection will be established between the motor cars on opposite sides of the trailer cars by way of the circuit for supplying current to the heating units on the trailer cars. Each motor car may supply current only to the trailer car adjacent thereto, and the circuit from any motor car to the car on the other side of a trailer car which is connected to the motor car, is interrupted whether this car is another trailer car or another motor car.

As there is no circuit connection between the motor cars there is no possibility, if the motor or power cars of a train are situated in portions of the supply line which are energized at different voltages, that current will flow between the motor cars through the circuits provided to supply the heating elements on the trailer cars.

When the couplers of the trailer cars T1 and T2 are connected together, the contacts 184f and 184r in the electric portions of these couplers engage. These contacts control the control circuit and permit current to flow from the control circuit on the trailer car T2 to the trailer car T1.

The contacts 190f and 190r in the electric portions of the couplers of the trailer cars T1 and T2 engage when the couplers on these cars are coupled together, and these contacts will be energized if a control switch on a motor car is in the position to supply current to the light wire.

In addition, when the couplers of the trailer cars T1 and T2 are connected together, the contacts 178f and 178r thereof engage. The contacts 178f and 178r are each connected to the control wire, and when these contacts engage they establish a circuit between the control wires 180 on the trailer cars T1 and T2 which parallels that through the contacts 184f and 184r.

If the control wires on the trailer cars T1 and T2 are energized, current will be supplied therefrom through the electric portions of the uncoupling valve devices to the windings 187f and 187r of the contactors 188f and 188r to energize these windings and thus cause the movable contacts of these contactors to be held in their closed positions to complete the circuits through the light wires on these cars.

When the trailer cars T1 and T2 are to be uncoupled, the uncoupling valve device 160 associated with the coupler on one of the trailer cars is turned from the normal position to the uncoupling position. On this movement of the uncoupling valve device, the drum of the electric portion thereof is turned so as to move the drum contacts out of engagement with certain of the contact fingers associated therewith, thereby interrupting the circuits through the drum contacts.

On this movement of the uncoupling valve device, which for purposes of illustration is assumed to be the valve device on the forward end of the trailer car T1, the drum contacts 171f and 172f thereof interrupt the circuits controlled thereby, thus interrupting the supply of current from the control wire on the trailer car T2 to the control wire on the trailer car T1.

In addition, on this movement of the uncoupling valve device, the drum contact 173f is turned so as to interrupt the circuit through the winding 187f of the contactor 188f and on deenergization of this winding, the movable contact 189f of this contactor is operated to open the circuit through the light wire 186 on this trailer car, thereby cutting off flow of current between the contacts 190f and 190r.

If the uncoupling valve device on the rear of the trailer car T2 is turned to the uncoupling position, instead of turning the uncoupling valve device on the front of the trailer car T1 to the uncoupling position, the circuit changes described above will take place, and, in addition, the circuit to the winding of the contactor 188r on the trailer car T2 will be interrupted and this contactor will operate to interrupt the circuit controlled thereby.

In addition, on this movement of the uncoupling valve device on either trailer car from the normal position to the uncoupling position fluid under pressure is supplied to the mechanism in the couplers to operate the mechanism, as described in detail in the above identified U. S. Patent No. 1,571,222, to cause the contact carrying slides in the electric portions of the couplers to be retracted, and to cause the doors associated therewith to be moved to cover the contacts in these contact carrying slides. The mechanism in the couplers, is thereafter operated to release the couplers so that the cars may be moved apart.

When the trailer cars T1 and T2 are moved apart, the couplers carried thereby are separated, and the contact assemblies 105f and 105r carried by these couplers are separated, but as these contact assemblies are deenergized no arcing or burning of the current carrying portions thereof will occur. In addition, as the contact assemblies are deenergized there is no danger of injury to workmen or others who might touch the current carrying portions of these assemblies which are exposed after the cars are separated.

After the trailer cars T1 and T2 are moved apart the uncoupling valve device is returned to the normal position. On this movement of the uncoupling valve device, the supply of fluid under pressure to the couplers is cut off, and the drum in the electric portion is returned to the position in which the drum contacts carried thereby are engaged by the contact fingers associated therewith so as to complete the circuits through these drum contacts.

This equipment also operates in such a manner that when two motor cars are connected together no undesired circuits will be established between the two cars.

Thus when the couplers on the motor cars M1 and M2 are coupled together, the contact assemblies 5f and 5r on these couplers confront each other, but because of the construction of these contact assemblies, the current carrying portions thereof do not engage, and hence no circuit connection is established therebetween. This is clearly shown in Fig. 2, which shows the relationship of the contact assemblies on the couplers for two motor cars when these couplers are connected together.

In addition, when the couplers on the motor cars M1 and M2 are connected together the contacts 84f and 84r in the electric portions of these couplers engage so that current may flow between the control wires on the connected motor cars.

The contacts 78f and 78r in the electric portions of the couplers on the motor cars M1 and M2 will engage, and each of these contacts is connected through the winding of the magnetic contactor 50 on the end of the motor car with which the contact is associated. However, neither of these contacts is connected in any way to any source or current, and hence the windings of the contactors 50f and 50r will remain deenergized, and these contactors will not complete the circuits through the wires 42f and 42r leading to the contact assemblies 5f and 5r. As a result, therefore, the contact assemblies 5f and 5r not only will not be connected to each other, but each will be deenergized. There is no possibility, therefore, that a connection will be established between the circuits on the two motor cars by means of which the current collecting means on the two motor cars might be connected together, or to the current consuming means, such as the driving motors, on the other of the motor cars.

The contacts 90f and 90r associated with the light wire 86 will engage at this time.

Assuming that the control wires on the motor cars M1 and M2 are energized, current will be supplied therefrom to the windings 87f and 87r of the contactors 88f and 88r, and the movable contacts 89f and 89r of these contactors will be held in their closed positions to complete the circuits through the light wires on these motor cars.

When the motor cars M1 and M2 are to be uncoupled the uncoupling valve device on either of these cars is turned from the normal position to the uncoupling position, thereby moving the drum associated therewith to move the drum contacts out of engagement with certain of the contact fingers associated therewith.

For purposes of illustration, it will be assumed that the uncoupling valve device on the forward end of the motor car M1 is operated. When this uncoupling valve device is turned to this position, the connection between the control wires on these motor cars is broken, while the circuit through the winding 87f of the contactor 88f is interrupted. The movable contact 89f is thereupon moved to the open position, thereby opening the circuit through the light wire 86 on this motor car, thus cutting off the flow of current between the contacts 90f and 90r.

A similar change in these circuits takes place if the uncoupling valve device on the rear end of the motor car M2 is turned to the uncoupling position. If this valve device is turned to the uncoupling position, the circuit through the winding 87r of the contactor 88r will be interrupted, and this contactor will operate to interrupt the light wire 86 on this motor car.

On movement of the uncoupling valve device on either motor car to the uncoupling position, fluid under pressure is supplied to the mechanism in the couplers to operate this mechanism to cause the contact carrying slides in the electric portions of the couplers to be retracted, and to cause the doors associated therewith to be moved to cover the contacts of the contact carrying slides. The mechanism in the couplers is thereafter operated to release the couplers so that the couplers may be separated.

When the motor cars M1 and M2 are moved apart the couplers carried thereby are separated, and the contact assemblies 5f and 5r carried by these couplers are also separated, but as they are both deenergized at this time no arcing or burning of these members will occur. In addition, as the contacts of these contact assemblies are deenergized there is no possibility of injury to workmen or others who might touch one of these contacts which are exposed after the cars are parted.

After the motor cars M1 and M2 are moved apart, the uncoupling valve device is returned to the normal position. On this movement of the uncoupling valve device the supply of fluid under pressure to the couplers is cut off, while the drum in the electric portion of the uncoupling valve device is returned to the position in which the drum contacts carried thereby are engaged by the contact fingers associated therewith so as to complete the circuits through these drum contacts.

This equipment also operates in such a manner that if a trailer car is connected between two motor cars, that no undesired circuits are established between the two motor cars.

Thus if the motor car M3 is connected to the right hand end of the trailer car T1 in place of the trailer car T2, as shown in Fig. 4 of the drawings, the contact assembly 5r on the motor car M3 will establish connection with the contact assembly 105f on the coupler of the trailer car T1.

In addition, the contact 84r in the electric portion of the coupler on the rear end of the motor car M3 will establish connection with the contact 184f in the electric portion of the coupler on the front end of the trailer car T1. Also the contact 78r in the electric portion of the coupler on the motor car M3 will establish connection with contact 178f in the electric portion of the coupler on the trailer car T1 so that current will be supplied from the control wire 180 on the trailer car T1 to the winding 54r of the magnetic contactor 50r on the motor car M3. The magnetic contactor 50r will be operated, therefore, to establish connection from the trolley 44 through the wire 42r to the contact assembly 5r on the coupler on the rear end of the motor car M3.

As the contact assembly 105f on the front of the trailer car T1 is in engagement with the contact assembly 5r on the rear of the motor car M3 at this time, the contact assembly 105f and the wire 134f on the trailer car T1 will be supplied with current from the motor car M3. Similarly, the contact assembly 105r and the wire 134r on the other end of the trailer car T1 will be supplied with current from the motor car M2.

Current, therefore, will be supplied to the contact assemblies on each end of the trailer car T1. However, the switch blade 140 can be operated to establish connection with only one of the contacts 136r and 136f at a time, and can never establish connection with both at the same time. As a result, the heating unit 138 on the trailer car T1 will be energized from the contact assembly on one end of the trailer car, and no circuit will be established between the contact assemblies on the opposite end of the trailer car.

When the cars are coupled together as shown in Fig. 4 of the drawings, connections are established through the electric portions of the couplers between the light and control wires, while the windings of the contactors controlling the light wire are supplied with current so that these contactors are operated to close the contacts controlled thereby.

The changes which occur in uncoupling the trailer car T1 and the motor car M3, if these are connected together, are substantially the same as occur when uncoupling another motor car and trailer car and have been described in detail above.

The control circuit in the cars of these trains carries a relatively heavy current, and it may be desired to employ magnetic contactors to interrupt and to complete the control circuit, instead of controlling this circuit through the contacts associated with the uncoupling valve devices, and in Fig. 5 of the drawings there is illustrated a diagram of the circuit connections which may be employed for this purpose.

The equipment shown in Fig. 5 of the drawings is generally similar to that shown in Fig. 1 of the drawings, and includes couplers 1 and 101 for a motor car and for a trailer car, respectively, the couplers having contact assemblies 5 and 105 associated therewith. The couplers 1 and 101 also have electric portions, not shown, which include contacts which connect the portions of the control wire 80 and 180, and the portions of the light wire 86 and 186, on the motor and trailer cars, and to also connect the wires 76 and 176 so as to control the supply of current to the winding 54 of the contactor 50 on the motor car, which controls the supply of current to the heating unit on the trailer car.

The couplers 1 and 101 also have associated therewith contactors 88 and 188 to control the light wires 86 and 186, respectively, and the supply of current to the windings of these contactors is controlled by the electric portions of the uncoupling valve devices.

The uncoupling valve devices, indicated at 60a and 160a, are similar to those shown in Fig. 1 of the drawings, but differ therefrom, as the electric portions of these valve devices are provided with four drum contacts instead of three.

The drum contacts 71a and 73a, and the drum contacts 171a and 173a, of the uncoupling valve devices 60a and 160a, together with the circuit connections associated therewith, are identical with the corresponding portions of the uncoupling valve devices 60 and 160 shown in Fig. 1 of the drawings.

The equipment associated with the coupler 1 on the motor car includes a contactor 80a interposed in the control wire on the motor car, and having a movable contact 80b for controlling the circuit through the control wire. The movable contact 80b has biasing means, not shown, associated therewith and normally urging said contact to its open position, while this contact has a pair of windings 80c and 80d associated therewith, either of which is operative upon energization to move the movable contact to the closed position.

One terminal of each of the windings 80c and 80d is connected to ground, while the other terminal of the winding 80c is connected to a contact finger which engages a drum contact 72a of the electric portion of the uncoupling valve device 60a. This drum contact is also engaged by a contact finger to which is connected a wire 72c, which is connected to the control wire at a point on one side of the contactor 80a.

The other terminal of the winding 80d is connected to a contact finger which engages a drum contact 72b, which is also engaged by a contact finger which is connected by way of a wire 72d to the control wire 80 at a point on the side of the contactor 80a opposite from the point of connection of the wire 72c with the control wire.

On movement of the uncoupling valve device 60a to the uncoupling position, the drum 70a of the electric portion is turned to a position in which the drum contacts 72a and 72b are not engaged by certain of the contact fingers associated therewith, so that the supply of current to each of the windings 80c and 80d of the contactor 80a is cut off and the movable contact 80b is moved to the open position.

If the uncoupling valve device 60a is now returned to the coupling position, the drum contacts will again establish a circuit through the windings 80c and 80d of the contactor 80a, and because of the arrangement of the equipment, the contactor 80a will be operated to close the circuit through the control wire regardless of the side of the contactor to which current is supplied to the control wire.

Thus, if current is supplied to the control wire at a point on this wire at the left of the contactor 80a, as viewed in the drawings, current will flow by way of the wire 72d and through the drum contact 72b to the winding 80d to energize this winding, and thereby cause the movable contact 80b to be moved to the closed position.

If current is supplied to the control wire at a point on the left hand side of the contactor 80a, then when the movable contact 80b is in the open position, the portion of the control wire on the right hand side of the contactor 80a will be deenergized. On movement of the uncoupling valve device 60 to the coupling position, the drum contact 72a thereof will establish a circuit from the control wire to the winding 80c, but no current will be supplied to this winding while the movable contact 80b remains in the open position.

However, as pointed out above, the winding 80d will be energized, and will move the movable contact 80b to the closed position.

On movement of the movable contact 80b to the closed position, current is supplied to the portion of the control wire on the right hand side of the contactor 80a, and current will flow therefrom to the winding 80c to energize this winding, which will then assist the winding 80d in holding the movable contact 80b closed.

Similarly, if the control wire 80 is supplied with current at a point on the right hand side of the contactor 80a, as viewed in the drawing, the contactor 80a will be operated to complete the circuit controlled thereby.

Thus, if the uncoupling valve device 60a is turned to the uncoupling position, in which the supply of current to the winding 80c and 80d is cut off so that the movable contact 80b will be moved to the open position, and if the uncoupling valve device is then returned to the coupling position, the drum 70a thereof will be moved to a position in which the drum contact 72b again completes the circuit controlled thereby so that the winding 80d is connected to the control wire. However, this portion of the control wire is not energized, as the movable contact 80b is in its open position, so that no current is supplied to the winding 80d at this time.

On this movement of the drum 70a, the drum contact 72a is moved to a position to complete the circuit controlled thereby, and current flows from the control wire by way of the wire 72c and through the drum contact 72a to the winding 80c. Upon energization of this winding, the movable contact 80b is moved to the closed position so that current is supplied to the portion of the control wire at the left of the contactor 80a, from which it will flow by way of the wire 72d and through the contact 72b to the winding 80d.

It will be seen that the contactor 80a will be closed on movement of the uncoupling valve device 60a to the coupling position regardless of the point at which current is supplied to the control wire, which is controlled by the contactor 80a, and from which current is supplied to operate the contactor.

The equipment associated with the coupler 101, which is of the type adapted to be employed on a trailer car, includes a contactor 180a interposed in the control wire on the trailer car and having a movable contact 180b for controlling the circuit through this wire.

The movable contact 180b has biasing means associated therewith and normally urging the contact to its open position, and has, in addition, a pair of windings 180c and 180d associated therewith, either of which is operative upon energization to move the movable contact to the closed position.

One terminal of each of the windings 180c and 180d is connected to ground, while the other terminal of the winding 180c is connected to a contact finger which engages a drum contact 172a in the electric portion of the uncoupling valve device 160a. This drum contact is also engaged by a contact finger which is connected by way of a wire 172c to the control wire at a point on one side of the contactor 180a.

The other terminal of the winding 180d is connected to a contact finger which engages a drum contact 172b, which is also engaged by a contact finger which is connected by way of a wire 172d to the control wire at a point on the side of the contactor 180a opposite from the point of connection of the wire 172c therewith.

The supply of current to the windings 180c and 180d of the contactor 180a is controlled by the electric portion of the uncoupling valve device 160a in a manner similar to that described in detail in connection with the equipment on the motor car, and the contactor 180a will operate in substantially the same manner as the contactor 80a to close the circuit controlled thereby, regardless of the end of the train from which current is supplied to the control wire.

From the foregoing it will be seen that this equipment provides means to supply current from motor or power cars equipped with current collecting means to trailer or auxiliary cars which are not so equipped, and it insures that no connection will be established between cars equipped with current collecting means which is directly connected to the current collecting means on these cars so that there is no possibility of a circuit being established which might connect sections of the supply line which are energized at different voltages, or through which current might be supplied from the current collecting means on one motor or power car to the current consuming means, such as the driving motors, on another motor or power car.

It will be seen also that the equipment is arranged so that the contacts in the circuit through which current is supplied to the heating means on the trailer cars are deenergized at all times at which they are exposed, and that they are only energized when the couplers for a trailer car and for a motor car are coupled together, and then only after the contacts on the motor and trailer car are firmly engaged.

In addition, it will be seen that the contacts on the motor and trailer car through which current is supplied to the heating means on the trailer car are deenergized before they are separated when the motor and trailer cars are to be uncoupled.

It will be seen also that the control circuits in the electric portions of the couplers are deenergized before they are separated, and that thereafter they are protected by means of the doors associated with the couplers.

While one embodiment of the circuit control means provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a car coupling system, car couplers adapted to be coupled to each other, certain of said couplers being mounted on power cars having a source of electric current thereon, others of said couplers being mounted on auxiliary cars having current consuming means thereon, said couplers having contacts associated therewith and arranged such that when the couplers are coupled together said contacts establish a circuit through which current may be supplied from the source on a power car to the consuming means on an auxiliary car, a contactor associated with each power car coupler between the source of electric current and the contact associated with said coupler and controlling the supply of current to said contact, said contactors each having a winding and being operative only on energization thereof to complete the circuit controlled thereby, the couplers having contact means associated therewith for controlling the supply of current to said contactor windings, the contact means on said couplers being arranged so that when the couplers for two power cars are coupled together they do not connect the windings of the contactors to a source of electric current, and so that when a coupler for a power car and a coupler for an auxiliary car are connected together the winding of the contactor associated with the coupler on the power car will be connected to a source of electric current.

2. In circuit control means for vehicles having car couplers of the type having contacting means associated therewith and incorporating means operative only after the couplers are brought substantially into the coupled relationship for moving the contacting means thereon into engagement with each other, the couplers each having a contact associated therewith and adapted to engage a cooperating contact associated with a coupler coupled thereto, said contacts being adapted to engage before the couplers are fully coupled together, certain of said vehicles being power vehicles and having a source of electric current thereon, other of said vehicles being auxiliary vehicles and having current consuming means thereon adapted to be supplied from the contacts of the couplers carried thereby, the power vehicles having contactors thereon controlling the supply of current from said source to the contacts associated with the couplers carried thereby, the contactors having windings and being operative on the supply of current thereto to complete the circuits controlled thereby, the couplers on the auxiliary vehicles incorporating means operative on movement of the contacting means associated therewith into engagement with the contacting means on the coupler of a power vehicle to establish a circuit through which current is supplied to the winding of the contactor on the power vehicle, the contacting means associated with the couplers on the power vehicles being arranged so that when couplers on power vehicles are coupled together circuits are not established to supply current to the windings of the contactors on said power vehicles.

3. In circuit control means for vehicles which may be coupled into a train, the vehicles having car couplers of the type having contacting means associated therewith and incorporating means operative only after the couplers are brought substantially into the coupled relationship for moving the contacting means thereon into engagement with each other, certain of said contacting means being adapted to establish a circuit which may be supplied with current at one end of the train at one time, and at the other end of the train at another time, one of said couplers having electroresponsive means associated therewith for controlling said circuit and being operative on the supply of current thereto to complete said circuit, said coupler having an uncoupling device associated therewith movable between a normal position and an uncoupling position and being operative in the normal position to supply current to said electroresponsive means from the circuit controlled thereby at points on the said circuit on opposite sides of said electroresponsive means.

4. In circuit control means for use on a train comprising a plurality of cars having car couplers adapted to be coupled together, the couplers carrying contacts adapted to engage to establish a circuit which may be supplied with current at one end of the train at one time, and at the other end of the train at another time, one of said couplers having electroresponsive means associated therewith for controlling said circuit and being operative on the supply of current thereto to complete said circuit, said coupler having switch means associated therewith for controlling the supply of current to said electroresponsive means, said switch means being movable between an open position and a closed position and being operative in the closed position to supply current to the electroresponsive means from the circuit controlled by the electroresponsive means at points thereon on opposite sides of the electroresponsive means.

5. In a circuit control system, car couplers adapted to be coupled together, each of said couplers having a contact associated therewith and adapted to engage a contact associated with a connected coupler, some of said couplers having associated therewith circuits for supplying current to the contacts associated therewith and also having normally open switch means for controlling said circuits, the others of said couplers each having circuits associated therewith for supplying current from the contacts associated therewith to current consuming means, the couplers having means associated therewith and operative only when couplers of different types are coupled together to condition said switch means to complete the circuits controlled thereby, whereby the contacts to which current is supplied will be supplied with current only when connected to a contact having current consuming means associated therewith and will be deenergized at all other times.

6. In a circuit control system, car couplers adapted to be coupled together, each of said couplers having a contact associated therewith and adapted to engage a contact associated with a connected coupler, some of said couplers having associated therewith circuits for supplying current to the contacts associated therewith and also having normally open contactors for controlling said circuits, the others of said couplers each having circuits associated therewith for supplying current from the contacts associated therewith to current consuming means, the couplers having means associated therewith and operative only when couplers of different types are coupled together to condition said contactors to complete the circuits controlled thereby, whereby the contacts to which current is supplied will be supplied with current only when connected to a contact having current consuming means associated therewith and will be deenergized at all other times, each of said couplers having an uncoupling device associated therewith and movable between a normal position and an uncoupling position, the uncoupling devices associated with couplers of the type having current consuming means associated therewith being operative in the uncoupling position to maintain the contactor associated with a connected coupler in the open position.

7. In a train circuit control system, the combination of car couplers of the type having electric portions having movable contacts adapted to engage corresponding contacts on a connected coupler, the couplers incorporating means operable only after the couplers are substantially fully coupled together to project the movable contacts into engagement with each other, contact elements carried by the couplers and adapted to engage before the couplers are fully coupled together, some of said couplers being of a type having circuits associated therewith for supplying current to the contact elements carried thereby, said couplers also having switch means for controlling said circuits, others of the couplers being of a type having circuits associated therewith for supplying current from the contact elements carried thereby to current consuming means, said couplers having circuits thereon controlled by said movable contacts and operative only when couplers of the different types are coupled together to condition the switch means to complete the circuits controlled thereby, whereby the contacts to which current is supplied will be energized only when they are connected to contacts having current consuming means associated therewith and will be deenergized at all other times.

8. In a train circuit control system for use with car couplers having contacts associated therewith and adapted to engage when the couplers are coupled together to establish a control circuit which extends throughout the train, the couplers having uncoupling devices associated therewith, said couplers also having electroresponsive contactors associated therewith for completing and interrupting said circuit, said contactors being operative to complete said circuit only on the supply of current thereto, the control circuit being adapted to be supplied at one time with current at a point at one side of the contactor associated with a coupler and at a point on the other side of said contactor at another time, the uncoupling device for each of the couplers having associated therewith means for supplying current from said control circuit to the electroresponsive contactor associated with said coupler regardless of the side of the contactor to which current is supplied to the control circuit and without supplying current to the portion of the control circuit at the opposite side of the contactor.

9. In circuit control means for vehicles having car couplers of the type having contacting means associated therewith and incorporating means operative only after the couplers are brought substantially into the coupled relationship for moving the contacting means thereon into engagement with each other, the couplers each having a contact associated therewith and adapted to engage a corresponding contact associated with a coupler connected thereto, said contacts being adapted to engage before the couplers are fully coupled together, certain of said couplers having switch means associated therewith and controlling the circuits through the contacts associated with said couplers, each of said switch means having a winding and being operative on energization of the winding to complete the circuit controlled thereby, means operative on movement of the contacting means on a coupler having switch means associated therewith into engagement with the contacting means on a coupler not having switch means associated therewith for supplying current to the winding of said switch means, said means being arranged so that when the contacting means on two couplers having switch means associated therewith engage current is not supplied to the windings of the switch means, the couplers having switch means associated therewith also having associated therewith uncoupling devices, each of said devices being movable between a normal position and an uncoupling position and being operative on movement to the uncoupling position to interrupt the circuit through which current is supplied to the winding of the switch means associated with said coupler.

10. In circuit control means for vehicles having car couplers of the type having contacting means associated therewith and incorporating means operative only after the couplers are brought substantially into the coupled relationship for moving the contacting means thereon into engagement with each other, the couplers each having a contact associated therewith and adapted to engage a corresponding contact associated with a coupler connected thereto, said contacts being adapted to engage before the couplers are fully coupled together, certain of said couplers having switch means associated therewith and controlling the circuits through the contacts associated with said couplers, each of said switch means having a winding and being operative on energization of the winding to complete the circuit controlled thereby, means operative on movement of the contacting means on a coupler having switch means associated therewith into engagement with the contacting means on a coupler not having switch means associated therewith for supplying current to the winding of said switch means, said means being arranged so that when the contacting means on two couplers having switch means associated therewith engage current is not supplied to the windings of the switch means, each of said couplers having associated therewith an uncoupling device movable between a normal position and an uncoupling position and operative in the uncoupling position to release the couplers and permit the cars to be separated, said uncoupling devices being also operative in their uncoupling positions to interrupt the circuits to the windings of the switch means associated with said couplers.

JOHN W. LOGAN, Jr.